United States Patent [19]

Yokoyama et al.

[11] Patent Number: 5,196,215
[45] Date of Patent: Mar. 23, 1993

[54] CAVITY FORMING AGENT FOR EDIBLE FOODS

[75] Inventors: Kazuaki Yokoyama, Chiba; Kiyomi Taniguchi, Koshigaya; Hisao Sekiguchi, Tokyo; Tomiatsu Kaneko, Ichikawa, all of Japan

[73] Assignee: Myoshi Oil & Fat Co., Ltd., Tokyo, Japan

[21] Appl. No.: 814,192

[22] Filed: Dec. 20, 1991

Related U.S. Application Data

[63] Continuation of Ser. No. 585,774, Sep. 20, 1990, abandoned.

[51] Int. Cl.$^5$ ............................................. A21D 13/00
[52] U.S. Cl. ...................................... 426/94; 426/138; 426/281; 426/283; 426/549; 426/556; 426/602
[58] Field of Search ............... 426/549, 106, 112, 143, 426/279, 280, 282, 283, 512, 514, 556, 576

[56] References Cited

U.S. PATENT DOCUMENTS 4,104,413  8/1978  Wynn et al. ..................... 426/582

FOREIGN PATENT DOCUMENTS 59-42837  3/1984  Japan .

OTHER PUBLICATIONS

Fennema, O. R., Food Chemistry, 1985, pp. 668-680, Marcel Dekker, Inc., New York.

*Primary Examiner*—Joseph Golian
*Assistant Examiner*—Leslie Wong
*Attorney, Agent, or Firm*—Willian Brinks Olds Hofer Gilson & Lione

[57] ABSTRACT

A composition for use in cavity foods as breads, cakes and other cavity foods suitable for filling to prevent softening of bread-dough by forming uniform cavities and form films preventing the transfer of water and oil thereto on filling is disclosed. The composition comprises (by weight) 10% to 30% of edible oils and fats, 2% to 25% of polysaccharides, 0.1% to 5% of edible emulsifiers, and 40% to 88% of water.

7 Claims, No Drawings

CAVITY FORMING AGENT FOR EDIBLE FOODS

This application is a continuation, of application Ser. No. 07/585,774, filed on 9/20/90 now abandoned.

BACKGROUND OF THE INVENTION

The present invention relates to a cavity forming agent, particularly for application to the making of bread, cakes and other cavity foods suitable for filling. The agent prevents softening of bread dough by forming uniform cavities and films for preventing the transfer of water and oil thereto on filling.

Conventionally, pocket bread, English muffin bread, hot dogs buns, bread for sandwiches and various other kinds of bread have been used for cooking. Apart from pocket bread, they however, these types of bread require cutting when a filling is inserted. If the filling has a high water content, it penetrates the bread, softening it and causes faults such as deterioration of the taste when the bread is left for a long time. In order to prevent this, butter or margarine is applied to the inside of the bread. Pocket bread has a space called a pocket for filling. However, such bread takes a number of hours to make and, if the filling has a high water content, much the same problem as described above arises.

Several methods are known for making cavity bread that reduces the transfer of water and oil by solving the above problem, including baking flattened bread dough during fermentation (Japanese Patent Application Laid-Open No. 145242/1979), and making cavity bread by wrapping an air-containing material such as marshmallow in bread dough before baking (Japanese Patent Application Laid-Open No. 68337/1981).

However, bread with good cavities has never been obtained using conventional techniques. When the former method is used, uniform cavities can not be obtained, and the dough itself forms cavity surfaces. This causes the transfer of water inside (called "crust part" hereinafter) softening the bread and impairing the taste. The latter method was the disadvantage of requiring an extra equipment and a separate process for separately making the air-containing material. Moreover, when marshmallow is used, since it contains sugar, its taste may not match that of the filling.

Thus, bread with cavities obtained using conventional techniques does not have uniform cavities and cannot be used for other than specific kinds of filling.

The inventors previously published a method of making cavity bread for solving such problems (Japanese Patent Application Laid-Open No. 42837/1984).

The method has solved the problems of conventional techniques. However, since proteins are used in large amounts, hard films form, affecting the taste of the bread. Furthermore, upon filling, the transfer of water to the crumb part cannot be prevented.

The invention was developed to solve these problems. It is intended to provide a cavity forming agent which, when used to make bread, cakes and other such foods, forms uniform cavities and prevents the transfer of water and oil to the crumb part on filling, enabling the use of various fillings.

SUMMARY OF THE INVENTION

The inventors eagerly studied how to solve the problems described above and, as a result, developed a cavity forming agent which makes the cavity foods suitable for filling. The invention forms uniform cavities and prevents the crumb part from softening by forming films for preventing the transfer of water and oil from the filling into crumb part.

DETAILED DESCRIPTION OF THE INVENTION AND PREFERRED EMBODIMENTS

The cavity forming agent according to the invention has a composition by weight of 10% to 30% edible oils and fats, 2% to 25% polysaccharides, 0.1% to 5% edible emulsifiers, and 40% to 88% water.

Cited among the edible oils and fats to be used for the invention are animal oils and fats such as beef tallow, lard, etc.; solid vegetable oils and fats such as coconut oil, palm oil, palm kernel oil, etc.; liquid vegetable oils and fats such as soybean oil, rapeseed oil, cottonseed oil, safflower oil, peanuts oil, rice bran oil, etc.; the hydrogenated oils and fats obtained from the above animal and vegetable oils and fats; hydrogenated fish oils; the solid oils and fats obtained by fractionating the above solid animal and vegetable oils and fats and hydrogenated oils and fats or fractionated liquid oils; and the ester-interchange oils and fats obtained by subjecting one or more of the above animal or vegetable oils and fats or hydrogenated oils and fats to ester exchange. One of such edible oils and fats can be used alone or more than one of the above can be mixed.

Cited among the polysaccharides to be used for the invention are locust bean gum, guar gum, carrageenan, Arabic gum, Xanthan gum, tamarind seed gum, alginic acid, sodium alginate, pectin, cornstarch, potato starch, sweet potato starch, rice starch, wheat starch, chemically-processed starches such as phosphated and hydrolyzed etc. One of such polysaccharides can be used alone, or more than one of the above can be mixed.

Cited among the edible emulsifiers to be used are monoglycerides, diglycerides, lecithin, propylene glycol esters, sorbitan ester, sucrose ester, etc. One thereof may be used alone, or more than one of the above can be mixed.

The cavity forming agent according to the invention is composed of edible oils and fats, polysaccharides, edible emulsifiers and water, preferably with a composition by weight of 10% to 30% edible oils and fats, 2% to 25% polysaccharides, 0.1% to 5% edible emulsifiers, and 40% to 88% water. When edible oils and fats are less than 10% by weight, the composition according to the invention liquefies and can not easily be wrapped in bread dough. When the oils and fats are more than 30% by weight, they make oil off easily. When polysaccharides are less than 2% by weight, even-thickness films can not be formed easily so cavities break in some cases on baking and when they are more than 25% by weight unequally-thick films are formed.

When edible emulsifiers are less than 0.1% by weight, the composition according to the invention does not emulsify well and edible oils and fats and water separate readily. When they are more than 5% by weight, they taste intensely bitter or unpleasant even though it emulsifies stably. When water is less than 40% by weight the composition accumulates at the bottom of cavities, obstructing formation of even-thickness films after baking. When it is more than 88% by weight, the composition liquefies at normal temperature and can not easily be wrapped in bread dough.

Salt, flavors, colorants, spices, etc. can be added, if necessary, to the cavity forming agent according to the invention, preferably at a total ratio of less than 5% by weight.

Cited among such flavors are natural and synthetic cheese, butter and milk flavors, etc. Cited among such colorants are β-carotene, annatto yellow, paprika orange, etc. Cited among such spices are curry powder, mustard, wasabi (Japanese horseradish), etc.

Described next is the method of making the cavity forming agent according to the invention.

First a given amount of polysaccharides and edible emulsifiers is dissolved in water. In order to accelerate dissolution of polysaccharides, the mixture solution should be heated to 70° C. to 90° C. Next, after adding edible oils and fats, it is stirred using a homomixer or a homogenizer while hot. After it is uniformly emulsified, it is cooled to below normal temperature and the cavity forming agent according to the invention is obtained. If salt, flavors, colorants, spices, etc. are necessary, they should be dissolved or diffused in water phase or edible oils and fats before being added.

The foods made by using the cavity forming agent according to the invention have the cavities suitable for filling and films for preventing the transfer of the water and oil contained in the filling. Even when cavity bread is filled with meat sauce, fruit sauce, mayonnaise, etc. which have high water contents, water and oil do not transfer to the crumb part easily and the bread retains its initial good taste for a long time.

The cavity forming agent according to the invention can be used to make cake bread, steamed bread, French bread, country bread, soft rolls and doughnuts with cavities; cakes injected with jam or custard cream, chiffon, siphon cakes, butter cakes, sponge cakes and other cakes; and rice cake, steamed buns, etc. with cavities for filling.

In order to obtain the cavity foods with the films for preventing the transfer of water and oil to the inside, 10%~30% by weight of the cavity forming agent according to the invention is wrapped in the dough of the above foods and baked or heated in the normal matter at a temperature higher than 100° C. This wrapping may be performed either by hand or using an "an" (bean jam) wrapping machine. The cavity forming agent wrapping dough may be molded into the desired shape.

In addition to forming cavities for filling, the cavity forming agent according to the invention may be used as follows: flavoring materials such as vegetables, fruits, nuts or those dried or crushed are added to the cavity forming agent, then the mixture is molded into a regular or irregular form of suitable size (about 1–2 cm³) and mixed into the dough or scattered over its sheet.

When the cavity forming agent is scattered over a sheet of dough, another sheet is placed on top and gently pressed against it. Having many cavities and a taste, a product, such as bread, baking such a dough is edible without further processing. These flavoring materials are not limited to those mentioned above—powdered processed foods such as cream, chocolate, jams, "an", etc. may be used for the same purpose. Such flavoring materials may be added at the desired ratio of 2% to 50% by weight, if necessary, within a range where the emulsified condition does not change.

EXAMPLE 1 TO 5, COMPARATIVE EXAMPLES 1 TO 6

Polysaccharides and edible emulsifiers were added to water at the mixing ratio in Table 1 and dissolved by heating to 85° C. and stirring. After adding edible oils and fats, this mixture solution was stirred at 85° C. for 10 minutes using a homomixer and cooled to 5° C., then 11 kinds (example 1 to 5, comparative examples 1 to 6) of the cavity forming agent were obtained.

10 grams of the above cavity forming agent was wrapped in 50 g. of the dough of soft roll bread and this combination was baked at 200° C. for 12 minutes, producing cavity soft roll bread. Table 2 shows the measured values of its cavities and films as well as of transferred water.

The dough of soft roll bread was prepared as follows.

| Primary kneading: | |
|---|---|
| Bread flour: | 70 parts |
| Yeast: | 2.5 parts |
| Water: | 40 parts |
| Mixed on final kneading: | |
| Bread flour: | 30 parts |
| Sugar: | 8 parts |
| Salt: | 1.6 parts |
| Skim milk: | 3 parts |
| Whole eggs: | 6 parts |
| Shortening: | 3 parts |
| Water: | 24 parts |

COMPARATIVE EXAMPLE 7

Ten grams of Cheddar cheese was wrapped in 50 grams of the dough of soft roll bread and baked in the same manner as the above examples, producing cavity soft roll bread. Table 2 shows measured values of its cavities and films as well as of the amount of transferred water.

COMPARATIVE EXAMPLE 8

3 parts of disodium phosphate, 10 parts of rennet casein, 5 parts of acid casein and 10 parts of soybeans protein were dissolved by heating to 85° C. in 52 parts of water. After adding 20 parts of hydrogenated fish oil (mp 38° C.), this mixture solution was stirred at 86° C. for 10 minutes and, after heating, cooled to 5° C., producing the cavity forming agent. 10 grams of the cavity forming agent was wrapped in 50 g. of the dough of soft roll bread and this combination was baked in the same manner as example. Table 2 shows the measured values of its cavities and films as well as of transferred water.

TABLE 1

| Ingredient (in Wt %) | Example number | | | | | Comparative example number | | | | | |
|---|---|---|---|---|---|---|---|---|---|---|---|
| | 1 | 2 | 3 | 4 | 5 | 1 | 2 | 3 | 4 | 5 | 6 |
| Edible fat & oil | | | | | | | | | | | |
| Beef tallow | 10 | | 5 | | 5 | 4 | 3 | 10 | | | 30 |
| Hydrogenated fish oil (mp 38° C.) | 10 | 3 | | 15 | 2 | | 5 | 5 | 12 | | |
| Hydrogenated soybean oil (mp 34° C.) | 10 | 2 | 5 | | | 2 | 20 | 10 | | | |
| Hydrogenated rapeseed oil (mp 32° C.) | | 5 | 5 | 10 | 3 | 2 | 5 | 3 | | 10 | |
| Polysaccharide | | | | | | | | | | | |
| Rice starch | 5 | 5 | | 3 | 1 | | | | 2 | | 10 |

TABLE 1-continued

| Ingredient (in Wt %) | Example number | | | | | Comparative example number | | | | | |
|---|---|---|---|---|---|---|---|---|---|---|---|
| | 1 | 2 | 3 | 4 | 5 | 1 | 2 | 3 | 4 | 5 | 6 |
| Corn starch | 5 | 10 | | 3 | | 5 | 5 | 1 | 10 | | |
| Locust bean gum | | | 2 | | | | 10 | | | 1 | |
| Guar gum | 5 | | | 4 | | 10 | | | 5 | | |
| Arabic gum | 2 | | | | | | | 0.5 | 5 | | |
| Xanthan gum | | 5 | | 1 | | | | | | | 5 |
| Alginic acid | 3 | | | 1 | | | | | | | |
| Sodium alginate | 5 | | | | 1 | 5 | | | 3 | | |
| Pectin | | | 2 | | | | 2 | | | | |
| Carrageenan | | | | 3 | | 2 | 1 | | 2 | 1 | |
| Edible emulsifier | | | | | | | | | | | |
| Monoglyceride | | 0.5 | 1 | | | | | 0.1 | 0.1 | 1 | 1 |
| Diglyceride | | | 0.5 | | | | | | | 1 | |
| Lecithin | 1 | | | 0.1 | | | | 0.1 | | 3 | |
| Plopylene glycol ester | | | 0.5 | | | 0.5 | | | | | |
| Sorbitan ester | 1 | | | | | | | 0.1 | 1 | | |
| Sucrose ester | 3 | 1 | 2 | | 0.1 | 2 | 0.1 | 0.3 | 2 | 3 | |
| Water | 40 | 68.5 | 79 | 57.9 | 87.9 | 67.5 | 48.7 | 70 | 56 | 81 | 55 |

TABLE 2

| | State of cavity | State of film | Water transfer test | Total judgement |
|---|---|---|---|---|
| Example 1 | ○ | ○ | ○ | ○ |
| Example 2 | ○ | ○ | ○ | ○ |
| Example 3 | ○ | ○ | ○ | ○ |
| Example 4 | ○ | ○ | ○ | ○ |
| Example 5 | ○ | ○ | ○ | ○ |
| Comparative example 1 | Δ | X | X | X |
| Comparative example 2 | X | X | X | X |
| Comparative example 3 | X | X | X | X |
| Comparative example 4 | Δ | Δ | X | X |
| Comparative example 5 | X | X | X | X |
| Comparative example 6 | Δ | X | X | X |
| Comparative example 7 | Δ | Δ | Δ | X |
| Comparative example 8 | Δ | Δ | Δ | X |

Notes for Table 2

(1) State of Cavities

One liter of rapeseeds was prepared. Next, baked bread was put in a 1-liter measure, the spaces among the pieces of bread were filled by pouring in rapeseeds, and the volume of the remainder of the rapeseeds was measured to determine the volume of bread. Next, bread pieces were cut at the mid-point, the cut pieces were filled with rapeseeds, and their volume was measured to determine that of cavities.

The cavity ratio was calculated by using the following equation and cavities were classified by applying the following criteria.

$$\text{Cavity ratio (\%)} = \frac{\text{Volume of cavities}}{\text{Volume of bread}} \times 100$$

○: cavity ratio more than 20%, or cavities located at center
Δ: cavity ratio more than 10% and less than 20%, or cavities are not located at center
X: cavity ratio less than 10%, cavities not located at center (2) State of Films Baked bread was cut laterally and longitudinally into four pieces, then the thickness of films was measured at four points, up, down, right and left, and classified by applying the following criteria.

○: even-thickness films formed and the difference between the upper and lower limits of the thickness at the four points of films less than 2 mm.
Δ: films having uneven thicknesses and the difference between the upper and lower limits of the thickness at the four points of films more than 2 mm and less than 3.5 mm
X: partial films formed, with film forming agent penetrating into the crumb part or the films formed having uneven thickness with a variation of more than 3.5 mm.

(3) Water transfer test 5 pieces of bread containing yogurt were prepared by injecting 60 cc of commercially available yogurt into one piece of baked soft roll bread (48~50 g. per piece). At the same time five pieces of the standard soft roll bread, whose cavities were unfilled, were prepared. Both were made to stand at room temperature for 24 hours. Both at the start and 24 hours later, the water contents at the nearly center crumb part between the upper face (crust) and lower face (films of the cavity forming agent) was measured using a microwave moisture meter. The differences of absolute values between average water content values of (A) and (B) were classified by applying the following criteria (water contents of standard bread: upper crumb face 33%~35%, lower crumb face 38%~42%)

○: difference between the water contents of (A) and (B): less than 3% at the upper and lower crumb faces of bread
Δ: difference between the water contents of (A) and (B): less than 3% at the upper crumb face and over 3% at the lower crumb face of bread
X: difference between the water contents of (A) and (B): more than 3% at the upper and lower crumb faces of bread As is described heretofore, the cavity forming agent according to the invention is composed of edible oils and fats, polysaccharides, edible emulsifier and water at specific ratios. Bread, cakes and other foods made using the cavity forming agent according to the invention have uniform cavities for easy filling and films for preventing the transfer of water and oil to the inside. The taste of such foods thus be preserved and fillings with varied properties may be used. The invention is therefore effective in the preparation of a wide variety of processed foods.

We claim:

1. A cavity forming agent for edible foods wherein the food is selected from the group consisting of cakes and breads comprising by weight 10% to 30% edible oils and fats, 2% to 25% polysaccharides, 0.1% to 5% edible emulsifiers, 40% to 88% water, and being free of proteins to the extent that the cavity forming agent does not form a hard film when baked.

2. The cavity forming agents for edible foods according to claim 1 wherein the edible oils and fats are selected from the group consisting of beef tallow, lard, coconut oil, palm oil, palm kernel oil, soybean oil, rapeseed oil, cottonseed oil, safflower oil, peanut oil, rice bran oil, the hydrogenated oils and fats obtained from the above edible oils and fats, hydrogenated fish oil, the solid oils and fats obtained by fractionating the above oils and fats, the liquid oils obtained by fractionating the above oils and fats, and the ester-interchange oils and fats obtained by ester-interchanging the above oils and fats.

3. The cavity forming agents for edible foods according to claim 1 wherein the polysaccharides are selected from the group consisting of locust bean gum, guar gum, carrageenan, Arabic gum, Xanthan gum, tamarind seed gum, alginic acid, sodium alginate, pectin, corn-starch, potato starch, sweet potato starch, rice starch, wheat starch and chemically-processed starches such as phosphated and hydrolyzed starch.

4. The cavity forming agents for edible foods according to claim 1 wherein the edible emulsifiers are selected from the group consisting of monoglyceride, diglyceride, lecithin, propyleneglycol ester, sorbitan ester and sucrose ester.

5. A food product made with the cavity forming agent of claim 1 wherein the food product is selected from the group consisting of cakes and breads.

6. The food product of claim 5 wherein the food product is selected from the group consisting of cake bread, steamed bread, French bread, country bread, soft rolls, doughnuts, cakes with injected jam or custard cream, chiffon cakes, butter cakes, sponge cakes, rice cake and steamed buns.

7. A cavity forming agent for edible foods wherein the food is selected from the group consisting of cakes and breads comprising by weight 10% to 30% edible oils and fats, 2% to 25% polysaccharides, 0.1% to 5% edible emulsifiers, 40% to 88% water, and being free of proteins.

* * * * *

UNITED STATES PATENT AND TRADEMARK OFFICE
CERTIFICATE OF CORRECTION

PATENT NO. : 5,196,215
DATED : March 23, 1993
INVENTOR(S) : Kazuaki Yokoyama et al.

It is certified that error appears in the above-indentified patent and that said Letters Patent is hereby corrected as shown below:

ON THE TITLE PAGE:

Item [75] Inventors, for the city of
residence of Kazuaki Yokoyama, delete "Chiba" and substitute therefor --Inba-gun--.

On title page, item [56] "FOREIGN PATENT DOCUMENTS" add the following reference:
   --56-68337    11/1979    Japan--.

On the title page, under "FOREIGN PATENT DOCUMENTS", add the following reference:
   --54-145242    5/1978    Japan--.

Column 3, lines 32 and 33, delete "chiffon, siphon cakes" should read --chiffon cakes--.

Signed and Sealed this

Eighth Day of November, 1994

Attest:

BRUCE LEHMAN

Attesting Officer    Commissioner of Patents and Trademarks